Feb. 18, 1941.  M. C. JONES  2,232,070
ALTERNATING-CURRENT DIRECT-CURRENT RECTIFIER CIRCUIT
Filed Sept. 30, 1939
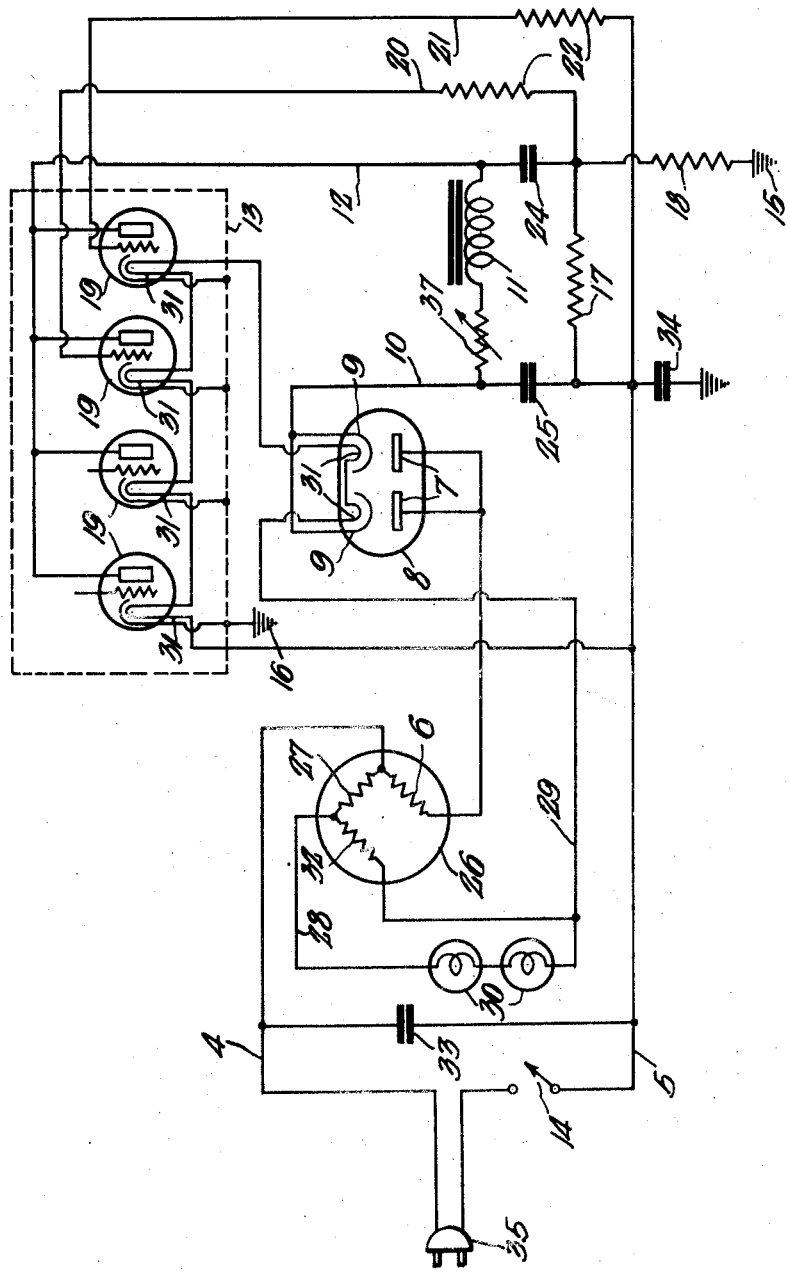
Inventor
*Mack C. Jones*
By
*[signature]*
Attorney Patented Feb. 18, 1941

2,232,070

UNITED STATES PATENT OFFICE

2,232,070

ALTERNATING-CURRENT DIRECT-CURRENT RECTIFIER CIRCUIT

Mack C. Jones, Haddon Heights, N. J., assignor to Radio Corporation of America, a corporation of Delaware Application September 30, 1939, Serial No. 297,347

2 Claims. (Cl. 171—97)

The present invention relates to power supply rectifier circuits for radio receiving apparatus and the like of the A. C.-D. C. type.

As is well known, apparatus of the type referred to includes a series rectifier circuit without a power transformer, in which the rectifier device is interposed between the supply line and the anode supply circuits of the apparatus, together with a suitable filter of the capacity input type which functions principally when operating on alternating current.

It has been found that, because the peak value of the alternating current wave is higher than the average value, the voltage output from a rectifier circuit of the type referred to is normally higher when connected with an alternating current supply source than when connected to a direct current supply source.

Accordingly, it is a principal object of the present invention to provide an improved rectifier circuit which is substantially independent of the frequency of the supply in that it provides substantially the same output on both A.-C. and D.-C. operation, whereby improved operation with such circuit is obtainable in A. C.-D. C. apparatus, such as radio receivers.

The invention will be better understood from the following description, when considered in connection with the accompanying drawing, and its scope is pointed out in the appended claims.

In the drawing, the figure is a schematic circuit diagram of a rectifier circuit embodying the invention and, for purposes of illustration, is shown schematically in connection with a plurality of amplifier tubes as a load for the high voltage direct current output therefrom.

Referring to the drawing, the series rectifier circuit includes a high voltage or positive input lead 4 connected through a series resistor 6 with the anodes 7 of a rectifier device 8, the anodes being connected in parallel and representing one or more anodes of any suitable rectifier device. The corresponding cathodes 9 of the rectifier device are likewise connected in parallel and the series circuit further continues through a lead 10 and a filter choke coil 11 to the positive anode supply lead 12 of an amplifier or other electronic device 13.

The low potential or negative side of the input circuit includes a lead 5 in which is connected a switch 14 for controlling the energization of the apparatus and the rectifier. The lead 5 is further connected to a common cathode return circuit for the apparatus 13, which in the present example, is a chassis ground connection 15—16, through series bias potential supply resistors 17 and 18 connected serially between the lead 5 and the ground 15, as indicated.

Grid bias potentials are derived from the resistors 17 and 18 for the tubes of the apparatus 13 indicated at 19, though supply leads 20 and 21 in which are located suitable filter resistors 22. Since the cathodes of the tubes 19 are connected to ground 16, it will be seen that the bias potential existing between the cathodes and the lead 21 is across both resistors 17 and 18, while that applied between the lead 20 and the cathodes is the potential across the resistor 18.

It will be noted that the power filter choke coil 11 is provided with an input shunt filter capacitor 25 and an output shunt filter capacitor 24, the first named capacitor being connected between the positive supply lead 10 from the rectifier and the negative lead 5, while the capacitor 24 is connected between the output supply lead 12 and the lead 5 through the choke coil 11, a resistor 37 and the resistor 17, thereby limiting the charging of the capacitor 24 in response to alternating current, as will hereinafter be pointed out.

The series limiting resistor 6 for the rectifier 8 is included in a ballast tube 26 with a series resistor 27 for the series pilot lamp circuit 28—29 which includes the filaments of two pilot lamps 30 and the heaters 31 of the rectifier 8 and the tubes 19. A shunt resistor 32 is provided in the ballast tube 26 for the pilot lamps 30. The power supply connection for the receiver and the rectifier circuit includes also a shunt capacitor 33 across the leads 4 and 5, with a bypass capacitor 34 from the low potential lead 5 to ground. Also, the leads 4 and 5 are provided with a suitable plug 35 for connection with the usual power supply circuits.

The operation of the system is as follows: With the plug 35 energized from a direct current source and the switch 14 closed, the plug 35 is so connected with the supply source (not shown) that the lead 4 is positive, which places a positive potential on the anode 7 causing current flow to the cathodes 9 and the circuit lead 10, choke coil 11 and the positive supply lead 12 thence to plate connections of the various tubes 19, the combined current flowing back from ground 15—16 through the bias supply resistors 18 and 17 to the negative supply lead 5. The bias potential developed in the resistors 18 and 17 is applied to the grid circuits 20 and 21 in the manner hereinafter indicated. Since the current supply is of the direct current type, the capacitors 25 and 24, when once charged, and the choke coil 11, are ineffective, there being no ripple current to smooth.

With the plug 35 energized from an alternating current source, however, and with the switch 14 closed, while the current flow is as above described through the anode circuit and negative return circuit, the peak of the alternating current is effective to charge the capacitors 25 and 24, resulting in a higher positive anode potential on the supply lead 12 with respect to ground. Since the capacitors 25 and 24 are continually being charged and discharged, the charging current flows through the resistor 6 causing an additional potential drop in addition to the load current, and likewise the resistors 17 and 37 and the choke coil 11, cause a reduction in the current flow to the capacitor 24 which is the output filter capacitor. This tends to maintain the same output voltage between the positive lead 12 and ground, as with the direct current supply and results from the use of controlling resistor 7 and a rectifier filter having capacity input as provided by the capacitor 25, advantage being taken of the fact that the circuit carries a heavier current on alternating current supply, and permits the use of a series input resistor 7 of a value to cause a voltage reduction with alternating current supply substantially equal to the difference between the average or R.M.S. alternating current voltage and the peak value thereof.

In a typical receiver circuit and with a rectifier circuit as shown, the resistor 37 may have a value of the order of 1000 ohms, with a resistor 7 of substantially the same value. This circuit is particularly effective in connection with apparatus designed to operate on the higher supply voltages, such as 220 volts, for example, and tends to provide the same voltage output on both A.-C. and D.-C. operation by proper proportioning of the values of the resistors 6 and 37. The latter is provided to control the value of the output voltage as determined by the resistor 7 and the capacitor 25 and is preferably adjustable for this reason.

The circuit shown, however, is referred to only by way of example, as other circuit modifications may be employed in other types of apparatus. However, in each case, the power supply circuit and the positive anode supply circuit are connected through a series rectifier including a limiting resistor preceding the rectifier and followed by a filter of the capacity input type, and with or without additional series controlling resistance for a second capacitor if used on the output filter. The value of the input limiting resistor is such that the drop through it in response to alternating current operation is sufficient to reduce the voltage at the output to the same value as for D.-C. operation, that is to cause a potential drop in operation substantially equal to the difference between the average value of the alternating current voltage of the supply and the peak value thereof, the resistance value of the resistor preceding the rectifier in the series supply circuit having a predetermined relation to the input capacitance of the filter and the resistance in circuit following the rectifier.

I claim as my invention:

1. A rectifier system for alternating and direct current supply comprising, in combination, an input lead, a rectifier device, a filter impedance and an output lead serially connected in the order named, a second input lead, a filter capacitor connected between said second input lead and the output side of said rectifier, means providing resistance in circuit between said first named input lead and said rectifier for reducing the output voltage to a normal value in response to A.-C. operation, resistance means connected between said second input lead and ground, and a capacitor connected between said output lead and an intermediate point on said resistance means.

2. A rectifier system for alternating and direct current supply comprising, in combination, an input lead, a rectifier device, a filter network and an output circuit serially connected in the order named, a second input lead, a filter capacitor connected between said second input lead and the output side of said rectifier, means providing resistance in circuit between said input lead and said rectifier for reducing the output voltage to a normal value in response to A.-C. operation, resistance means connected between said second input lead and ground, variable means for controlling the output potential to a predetermined value including a variable resistance element between the rectifier and the output lead, said last-named resistance element having a predetermined relation to the input resistance, and means for deriving a supply voltage from said resistance means.

MACK C. JONES.